(12) United States Patent
Konriki et al.

(10) Patent No.: US 9,380,006 B2
(45) Date of Patent: Jun. 28, 2016

(54) PACKET PROCESSING METHOD, AND PACKET TRANSMISSION APPARATUS

(71) Applicant: FUJITSU LIMITED, Kawasaki-shi, Kanagawa (JP)

(72) Inventors: Shigeo Konriki, Ikoma (JP); Satoshi Namura, Amagasaki (JP); Masatoshi Yamamoto, Uji (JP); Hisaya Ogasawara, Kobe (JP); Atsunori Yamamoto, Osaka (JP)

(73) Assignee: FUJITSU LIMITED, Kawasaki (JP)

( * ) Notice: Subject to any disclaimer, the term of this patent is extended or adjusted under 35 U.S.C. 154(b) by 65 days.

(21) Appl. No.: 14/320,768

(22) Filed: Jul. 1, 2014

(65) Prior Publication Data

US 2015/0049771 A1    Feb. 19, 2015

(30) Foreign Application Priority Data

Aug. 13, 2013  (JP) .................................. 2013-168346

(51) Int. Cl.
*H04L 12/28* (2006.01)
*H04L 12/861* (2013.01)

(52) U.S. Cl.
CPC ............ *H04L 49/90* (2013.01); *H04L 49/9005* (2013.01)

(58) Field of Classification Search
CPC .... H04L 49/90; H04L 49/9005; H04L 12/861
USPC .................... 370/412–418, 429, 440
See application file for complete search history.

(56) References Cited

U.S. PATENT DOCUMENTS

| | | | |
|---|---|---|---|
| 6,738,379 B1* | 5/2004 | Balazinski | H04L 29/06 370/394 |
| 6,744,762 B1* | 6/2004 | Hojo | H04L 47/10 370/392 |
| 2007/0019547 A1* | 1/2007 | Ho | H04L 12/6418 370/230 |
| 2009/0109844 A1* | 4/2009 | Lee | H04L 12/5693 370/230 |

FOREIGN PATENT DOCUMENTS

| | | |
|---|---|---|
| JP | 10-254763 | 9/1998 |
| JP | 2000-285011 | 10/2000 |

* cited by examiner

*Primary Examiner* — Mang Yeung
(74) *Attorney, Agent, or Firm* — Staas & Halsey LLP

(57) ABSTRACT

The packet processing method includes receiving a first packet, selecting a first storage area from a plurality of storage areas included in a buffer as a packet storage area in accordance with first time at which the first packet is received, and storing the first packet into the selected first storage area. The first storage area is selected as the packet storage area for the other packets received when a predetermined time period has passed from the first time.

8 Claims, 15 Drawing Sheets

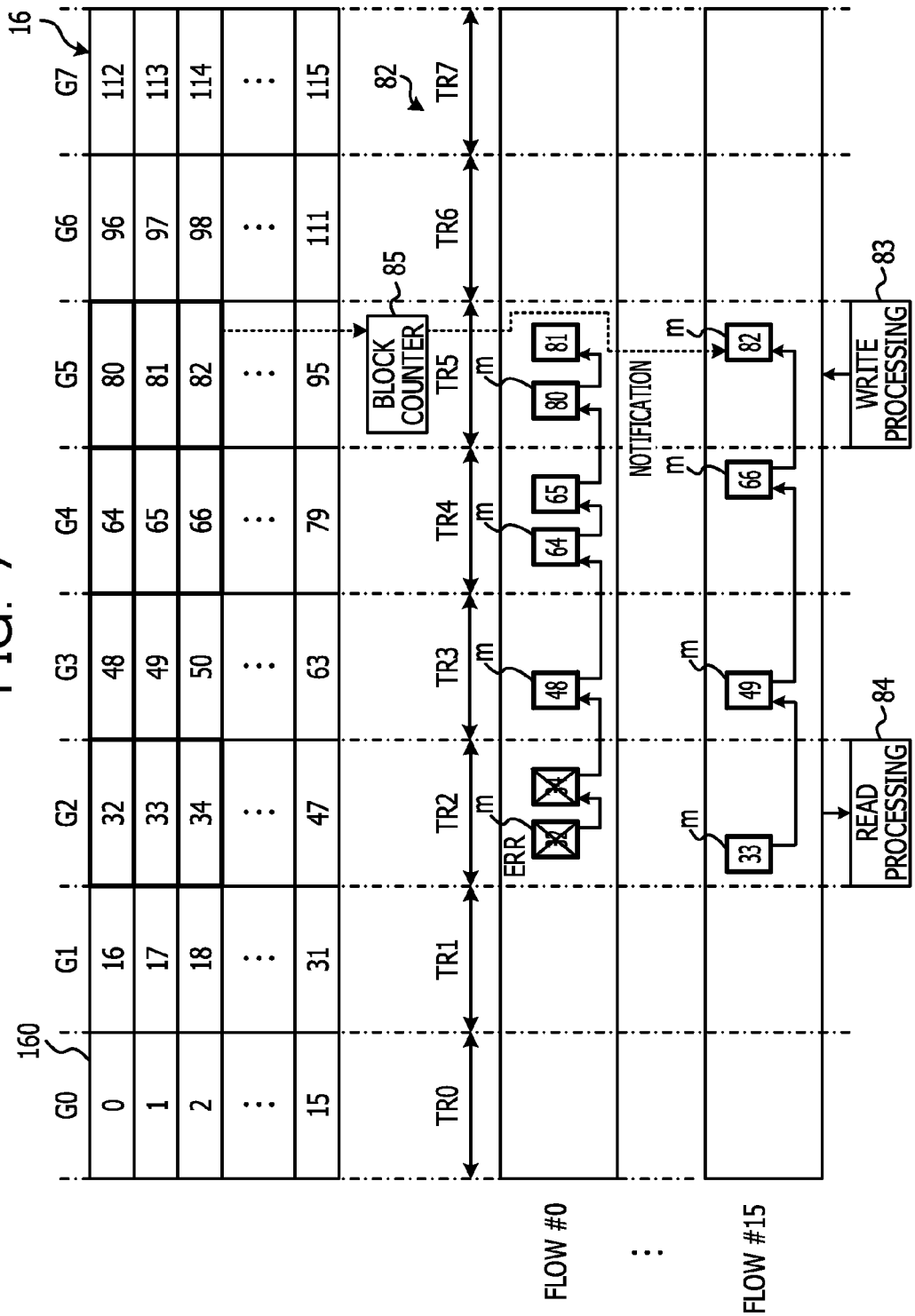

PACKET PROCESSING METHOD, AND PACKET TRANSMISSION APPARATUS

CROSS-REFERENCE TO RELATED APPLICATION

This application is based upon and claims the benefit of priority of the prior Japanese Patent Application No. 2013-168346, filed on Aug. 13, 2013, the entire contents of which are incorporated herein by reference.

FIELD

The embodiments discussed herein are related to a packet processing method a packet transmission apparatus.

BACKGROUND

With an increase in communication demand, an improvement in throughput is requested for packet switching apparatuses, such as a layer 2 switch, which transfers packets, and the like. In order to improve the throughput, packets are processed separately by a plurality of flows depending on priority, destination, and the like. Accordingly, management mechanisms of buffers for storing packets have become complicated.

For example, a chain management method, in which buffers for storing packets are managed by a series of pointer chains linked by link pointers, is known. By the chain management method, a pointer of an address at which a packet is written is obtained from a pointer chain, and after a packet is read from the buffer, the pointer is returned to the pointer chain.

As for the chain management method, for example, Patent Document 1 has disclosed a point where when a broken link occurs in an empty buffer chain for a certain buffer group, the buffer group is excluded from a buffer acquisition target, and the empty buffer chain is reorganized after passage of a certain time period. Also, Patent Document 2 has disclosed a point of automatically restoring a link at the time of obtaining and releasing a single pointer-type buffer in/from a single pointer-type buffer pool. As related-art technical documents, Japanese Laid-open Patent Publication Nos. 2000-285011 and 10-254763 have been disclosed.

SUMMARY

According to an aspect of the invention, a packet processing method includes receiving a first packet, selecting a first storage area from a plurality of storage areas included in a buffer as a packet storage area in accordance with first time at which the first packet is received, and storing the first packet into the selected first storage area. The first storage area is selected as the packet storage area for the other packets received when a predetermined time period has passed from the first time.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating a state when a memory error has occurred in the packet processing method according to the embodiment;

DESCRIPTION OF EMBODIMENTS

It is possible to apply a chain management method not only to an empty buffer, but also to management of buffers from which packets are read. In this case, for example, every time a packet is written into a buffer, a corresponding address is recorded in a pointer chain so that when the packet is read, it is possible to obtain the pointer of the address to be read from the pointer chain.

However, in this case, if a memory failure occurs in a memory storing a pointer chain, it is not possible to read a link pointer, and thus a link of the pointer chain is broken. Accordingly, it is not possible to obtain the pointer of an address to be read, and thus it becomes difficult to read a packet. Thereby, the pointer is not returned, and thus a problem arises in that the address of the storage area recorded in the pointer chain is not released, thereby making it not possible to use as an empty buffer. Accordingly, a storage area for storing packets becomes insufficient, and finally, it is desired to reset the apparatus, or the like, for example.

The present embodiments have been made in view of the above-described problems. It is desirable to provide a packet transmission apparatus having an improved buffer management function, a packet buffer, and a packet processing method.

Figure 1:
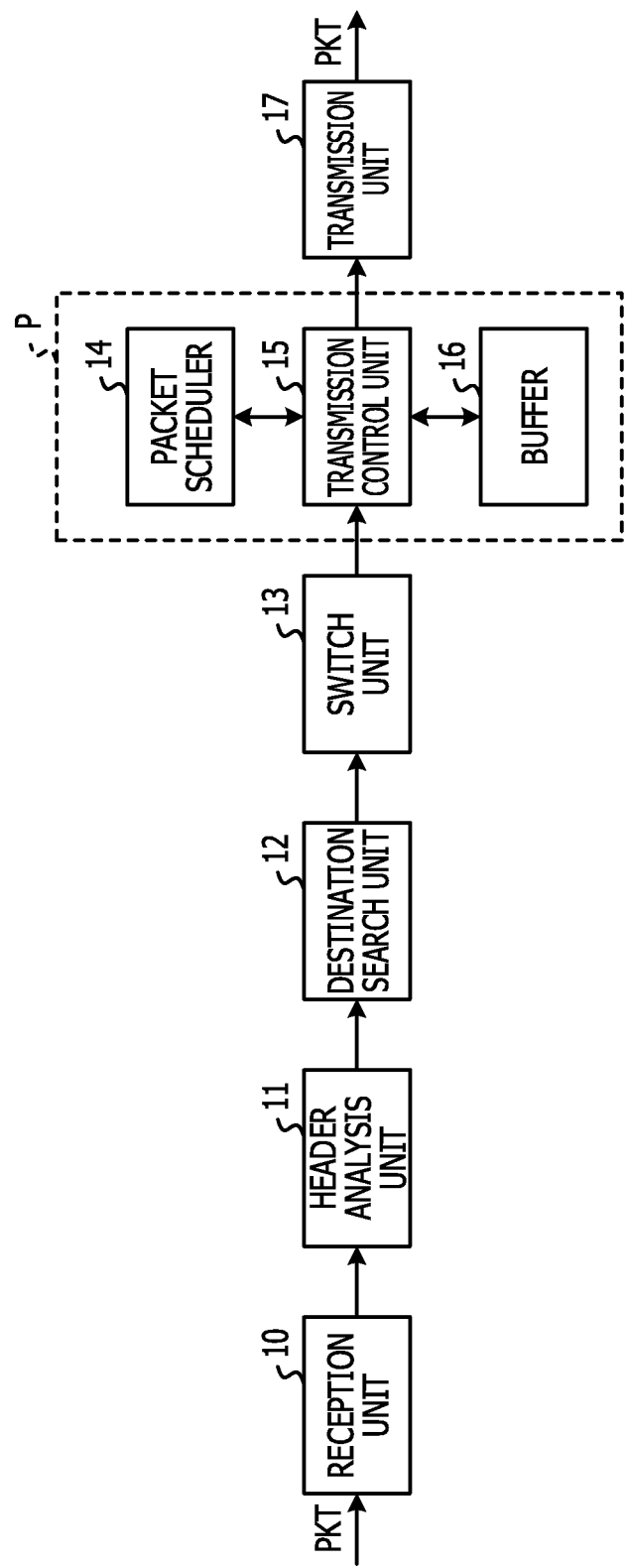
FIG. 1 is a configuration diagram illustrating a functional configuration of a packet transmission apparatus according to an embodiment.

FIG. 1 is a configuration diagram illustrating a functional configuration of a packet transmission apparatus according to an embodiment. The packet transmission apparatus is a layer 2 switch, for example, and includes a reception unit 10, a header analysis unit 11, a destination search unit 12, a switch unit 13, a packet scheduler 14, a transmission control unit 15, a buffer 16, and a transmission unit 17.

The reception unit 10 has a function of a physical (PHY)/media access control (MAC) layer, and receives a packet (PKT) from the other apparatuses through a transmission line. As a packet, an Ethernet (registered trademark) frame is given as an example. However, the packet is not limited to this, and for example, an Internet protocol (IP) packet may be given.

The header analysis unit 11 analyzes a header of a packet, and obtains destination information from the header. As the destination information, a destination address (DA) is given, for example, but the destination information is not limited to this.

The destination search unit 12 determines a flow of a packet based on the obtained destination information. The flow is a logical port for transmitting a packet.

The switch unit 13 switches packets among a plurality of ports based on the destination information. Thereby, the packet transmission apparatus transfers packets among different apparatuses.

The transmission control unit 15 temporarily stores a packet that was input from the switch unit 13 into the buffer 16, which is a packet buffer. Also, the transmission control unit 15 reads a packet from the buffer 16 in accordance with a transmission instruction from the packet scheduler 14, and outputs the packet to the transmission unit 17. The buffer 16 is a storing mechanism of packets, and includes a memory, for example. However, the buffer 16 is not limited to this, and the other devices, such as a hard disk drive, or the like may be employed.

The packet scheduler 14 performs scheduling on the packet transmission timing in accordance with a flow, and gives a packet transmission instruction in accordance with the scheduling to the transmission control unit 15. As a scheduling mechanism, a weighted round robin (WRR) is given as an example, but the scheduling mechanism is not limited to this.

The transmission unit 17 has a function of a PHY/MAC layer, and transmits a packet to the other apparatuses through a transmission line.

The packet scheduler 14, the transmission control unit 15, and the buffer 16 function as a packet output unit P, which performs output processing of a packet. In the following, a description will be given of a packet processing method used in the packet output unit P by comparing the embodiment and a comparative example.

Figure 2:
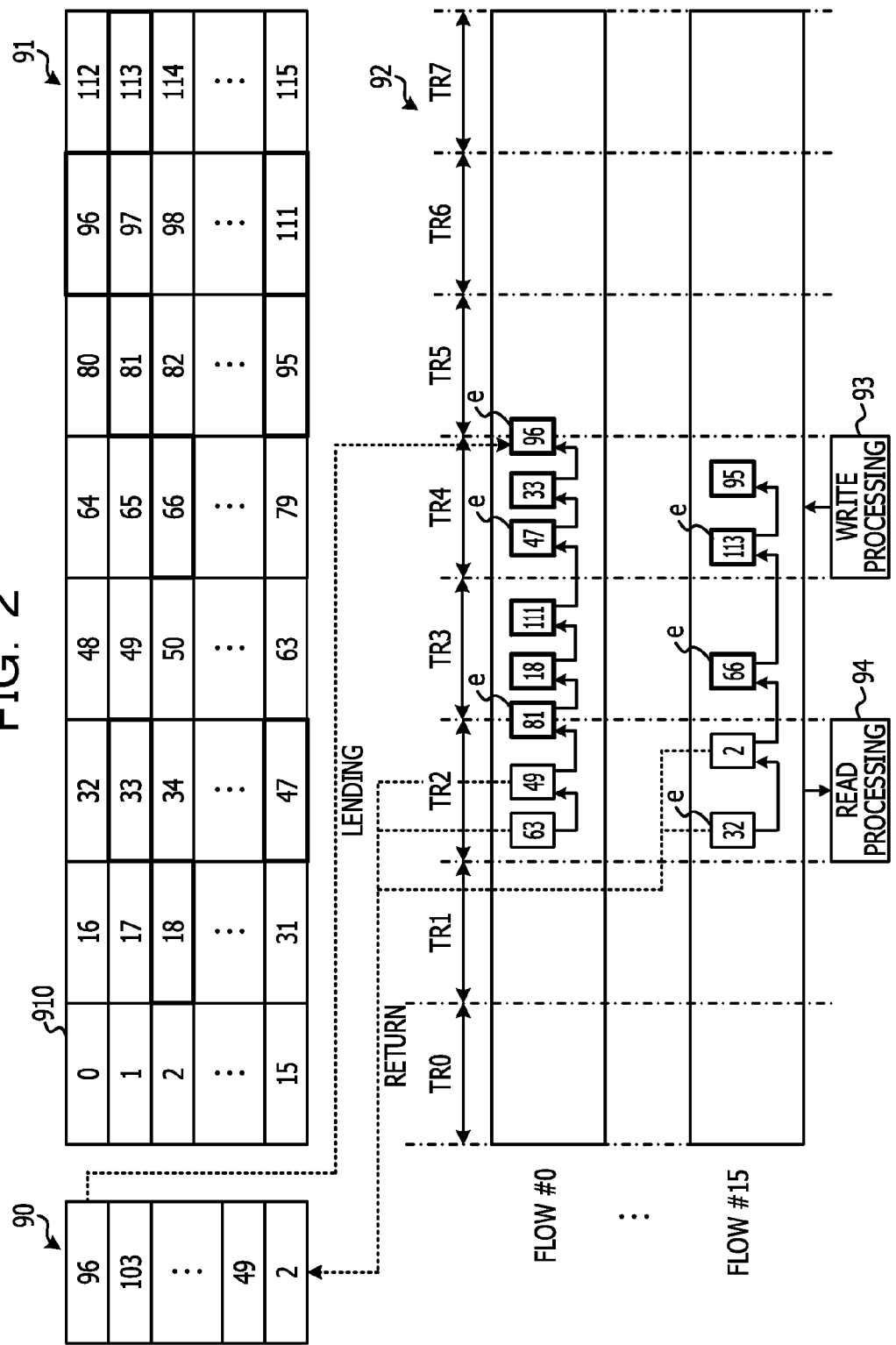
FIG. 2 is a diagram illustrating a packet processing method according to a comparative example.

FIG. 2 illustrates a packet processing method according to a comparative example. Also, FIGS. 3A, 3B, and 3C are configuration diagrams illustrating an example of a configuration of pointers used in the comparative example.

The buffer 91 includes a plurality of blocks 910. The block 910 is a storage area for storing one or more packets, and has 1024 address spaces, for example. In this example, in order to identify each of the blocks 910, block numbers of 0 to 115 (numeric characters in frames) are used.

Figure 3A:
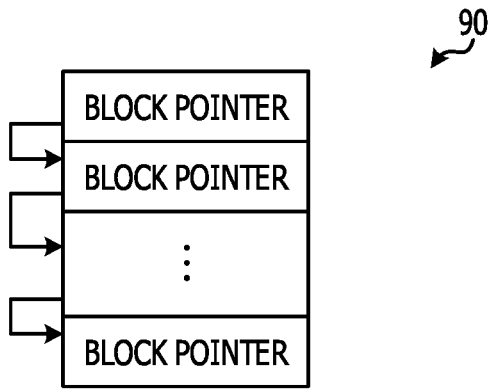
FIGS. 3A, 3B, and 3C are configuration diagrams illustrating an example of a configuration of pointers used in the comparative example.
Figure 3B:
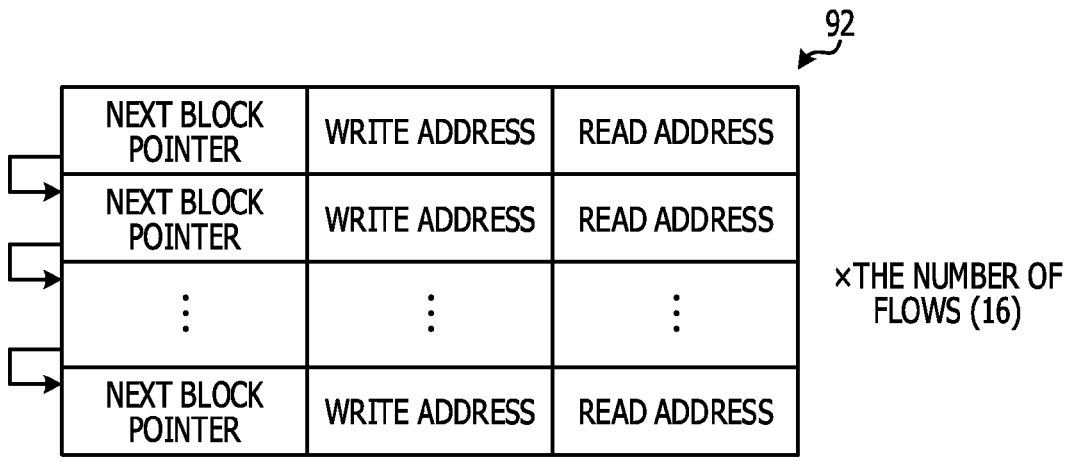
Figure 3C:

As illustrated in FIG. 3A, the block pointer chain 90 has a structure in which block pointers that indicate block numbers of packet-writable blocks 910, that is to say, blocks 910 having released addresses are linked with each other. For example, a block pointer having the block number of "96" indicates a position of a block pointer having the block number of "103".

The block pointer chain 90 lends out a block pointer of an empty block 910, that is to say, a packet-writable block 910 in sequence every time a packet is received to an address pointer chain 92. More specifically, the block pointer chain 90 has the same structure as that of first in first out (FIFO), and lends out in sequence from the beginning block pointer, that is to say, from the block number recorded first. In the example in FIG. 2, the block pointer of the block number "96" is lent. In this regard, in FIG. 2, block pointers ("18", "33", "47", and the like) of the blocks 910 in bold frames, among the plurality of blocks 910, represents being lent.

The lent block pointer is linked to the last of the address pointer chain 92. As illustrated in FIG. 3B, the address pointer chain 92 is disposed for each of the flows #0 to #15, and has a structure in which a next block pointer, that is to say, the block numbers to be written next or to be read next are linked with each other. Further, the address pointer chain 92 has a write address and a read address that are corresponding to each of the next block pointers. In this regard, the address pointer chain 92 is stored by a storage mechanism, such as a random access memory (RAM), or the like, for example.

The write address and the read address individually indicate addresses of the block 910. The write address is updated each time the write processing 93 writes a packet (packet data). The read address is updated each time the read processing 94 reads a packet (packet data). That is to say, the write address indicates the last address at which a packet has been written in the block 910, which is indicated by the next block pointer. The read address indicates the last address at which a packet has been read from the block 910, which is indicated by the next block pointer.

The block pointer chain 90 lends the block pointers to all the addresses of the last blocks 910 in the address pointer chain 92 each time the write processing 93 completes writing a packet. The block pointers that were lent are linked to the last block 910, that is to say, the next block pointers, and thus are recorded in the address pointer chain 92. Thereby, the write processing 93 is performed on the newly recorded block 910.

On the other hand, the packet read processing 94 is performed in sequence from the block 910 indicated by the next block pointer located at the beginning of the address pointer chain 92. Thereby, the read processing 94 is performed so as to follow the address pointer chain 92. In this regard, the read packet is transmitted to the other apparatuses through the transmission line.

The block pointers recorded in the address pointer chain 92 are returned to the block pointer chain 90 when the read processing 94 of packets from all the addresses of the block 910 is completed. In the example in FIG. 2, block pointers having the block number of "63", "49", "32", and "2" are returned to the block pointer chain 90 because the read processing 94 for all the addresses is completed. The returned block pointers are recorded by being linked to the last of the block pointer chain 90.

Also, in the example in FIG. 2, since the read processing 94 has not been completed for all the addresses on the block pointer having the block number of "81" and only a part of the addresses have been read, the block pointer is determined to be in an in-use state, and is not returned. In this regard, after the block pointer 910 is recorded in the address pointer chain 92, if a predetermined time passes, the block pointer 910 is returned to the block pointer chain 90 regardless of whether the read processing 94 on the block 910 has been completed or not.

The write processing 93 and the read processing 94 are performed on one or more block pointers in accordance with a plurality of time regions (TR)0 to TR7 in one cycle of the packet processing among all the block pointers recorded in the address pointer chain 92. In this example, a plurality of periods TR0 to TR7 are determined to be a period obtained by equally dividing one cycle of the packet processing by eight. However, the determination of a period is not limited to this.

The write processing 93 and the read processing 94 target the block pointers in accordance with different one of the periods among the plurality of periods TR0 to TR7, and the block pointers to be processed proceed to the other one of the periods in sequence after passage of a certain time. That is to say, the periods TR0 to TR7 are repeated. In the example in FIG. 2, the write processing 93 targets the block pointers (the block numbers "47", "33", "96", "113", and "95") in accordance with the period TR4. When a certain time passes, the write processing 93 targets the block pointers corresponding to the next period TR5. While the write processing 93 is being executed, when one of the periods TR0 to TR7 proceeds, an edge pointer is generated as illustrated by a symbol "e" in order to illustrate a boundary of a period in the address pointer chain 92.

As illustrated in FIG. 3C, the edge pointer has a structure in which a beginning block pointer and a beginning address are disposed for each of the flows #0 to #15, and for each of the periods TR0 to TR7. The beginning block pointer indicates a block pointer located at the beginning of each of the periods TR0 to TR7 for each of the flows #0 to #15 in the address pointer chain 92. Also, the beginning address indicates an address located at the beginning of each of the periods TR0 to TR7 in the block 910 indicated by the beginning block pointer. In this regard, the edge pointers are stored in a storage mechanism, such as a RAM, or the like, for example.

Also, in the example in FIG. 2, the read processing 94 targets the block pointers (the block numbers "63", "49", "81", "32", and "2") in accordance with the period TR2. When a certain time passes, the read processing 94 targets the block pointers corresponding to the next period TR3. While the read processing 94 is being executed, when one of the periods TR0 to TR7 proceeds, a block pointer is newly determined to be processed by the read processing 94 using the edge pointer as a mark.

In this manner, by a packet processing method according to the comparative example, the blocks 910 in the buffer 91 are divided for each of the time regions (TR0 to TR7) for management. After passage of a certain time, the block pointers are returned, and thus the addresses of the block 910 are released. Thereby, it becomes possible to write a new packet into the block 910, and the packet processing is performed by a head drop method. In this regard, the head drop method is a method in which packets are discarded in sequence from the packet stored in the buffer earliest. This is a contrasting method to a tail drop method, in which packets are discarded in sequence from the packet stored in the buffer latest.

In the comparative example, if a failure occurs in a memory storing the address pointer chain 92, it is not possible to read a link pointer, and thus a link of the address pointer chain 92 is broken. Accordingly, it is not possible to obtain a block pointer to be processed by the read processing 94, and thus it becomes difficult to read a packet.

Figure 4:
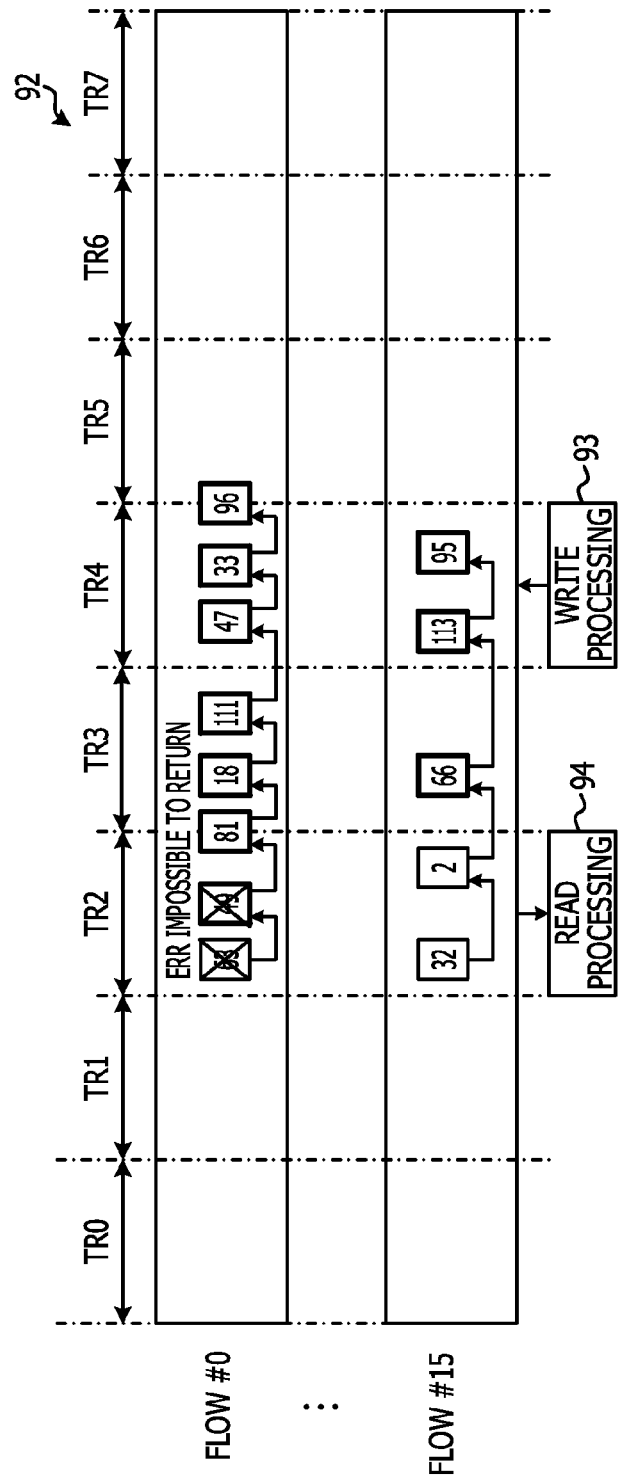
FIG. 4 is a diagram illustrating a state when a memory error has occurred in the packet processing method according to the comparative example.

FIG. 4 illustrates a state when a memory error has occurred in the packet processing method according to the comparative example. Here, it is assumed that a failure in the address pointer chain 92 in the flow #0 makes it difficult to read the block pointer having the block number of "63". At this time, it is not possible to follow the link of the address pointer chain 92, and thus it becomes difficult to read the block pointer of the succeeding block number "49" that belongs to the same period TR2 as that of the block pointer.

Accordingly, it is not possible to return the block pointer having the block number of "49" to the block pointer chain 90. In this regard, only the block pointer having the block number of "49" is illustrated as a block pointer up to the edge pointer (the block number "81") in the next period TR3 in FIG. 4. However, in reality, there are a large number of block pointers, and each of the block pointers becomes unable to be returned.

In this comparative example, if a block pointer is not returned, the address of the block 910 is not released, and thus it is not possible to use the block 910 as an empty block. Accordingly, if a memory error frequently occurs, the blocks 910 that store packets become insufficient. As a result, the packet transmission apparatus may be desired to be reset, for example. If a packet transmission apparatus is reset, such a problem that a communication line in service, which is provided by the packet transmission apparatus, is temporarily broken occurs.

In contrast, in a packet processing method according to the embodiment, a storage area in a buffer is divided into a plurality of groups corresponding to a plurality of periods in a cycle of the packet processing, a packet is written into a group area according to a reception period, and the address of each storage area is released at the time when a period of the group comes. Thereby, the management function of the buffers is improved.

Figure 5:
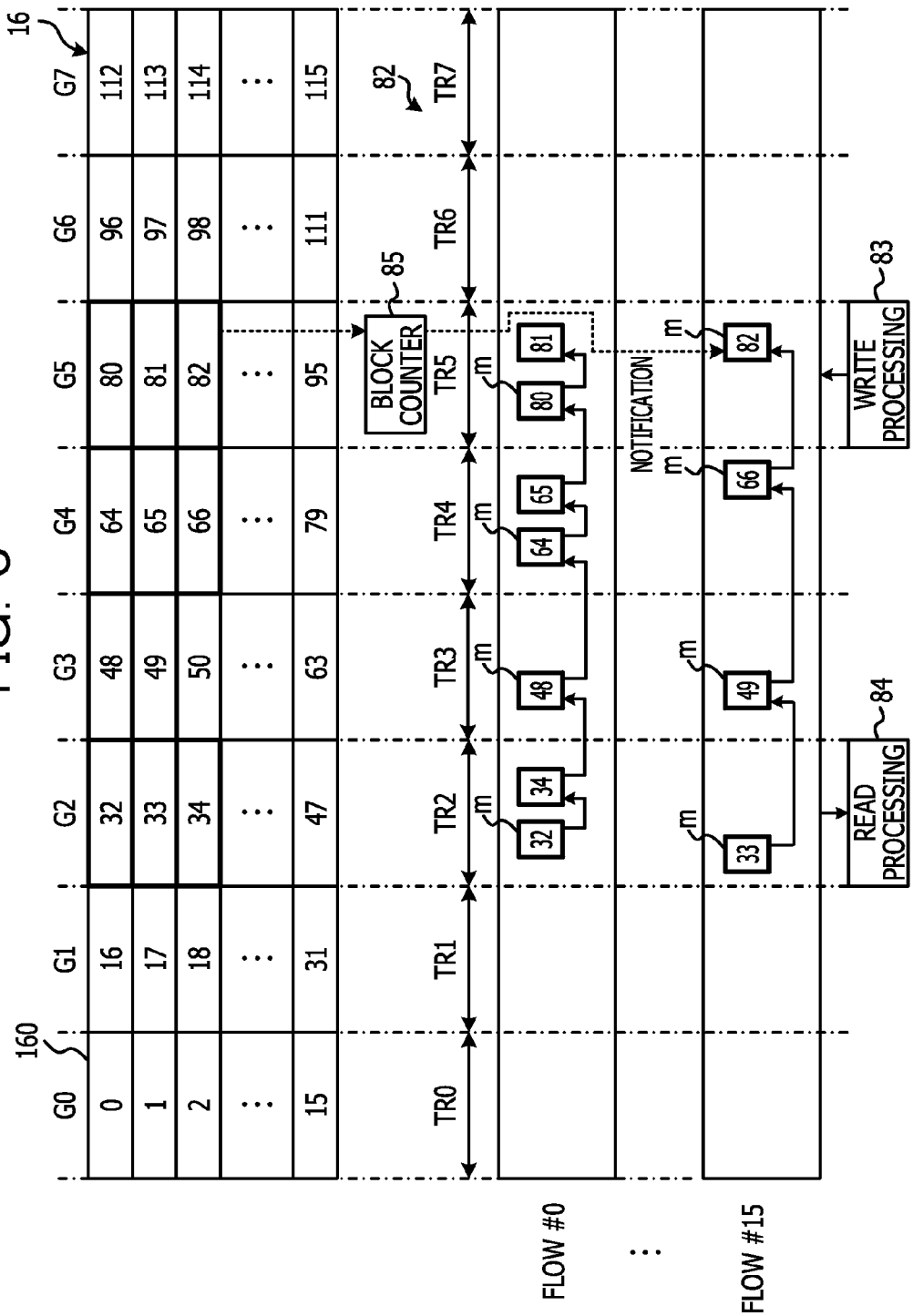
FIG. 5 is a diagram illustrating a packet processing method according to the embodiment.
Figure 6A:
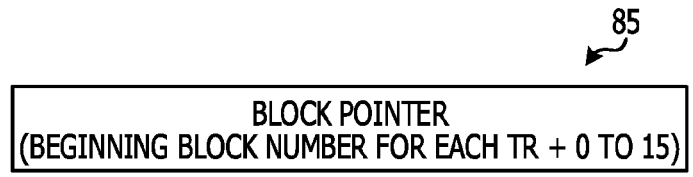
FIGS. 6A, 6B, and 6C are configuration diagrams illustrating an example of a configuration of pointers used in the embodiment.
Figure 6B:
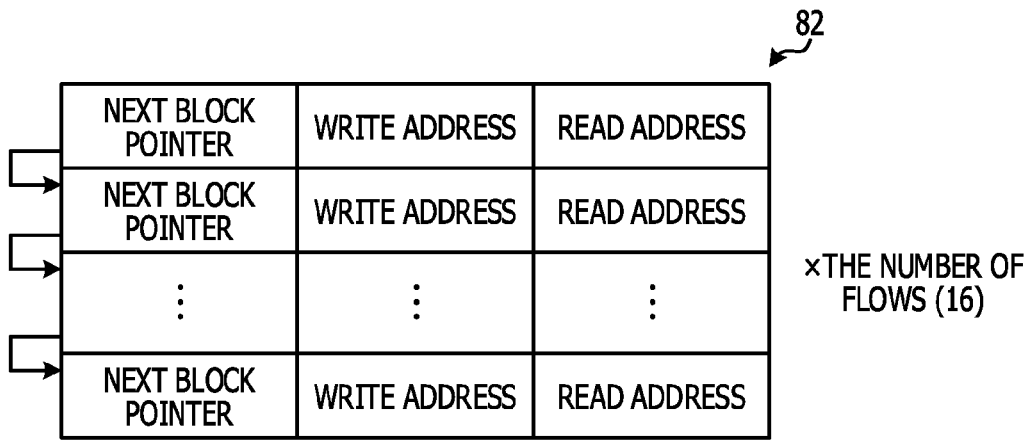
Figure 6C:
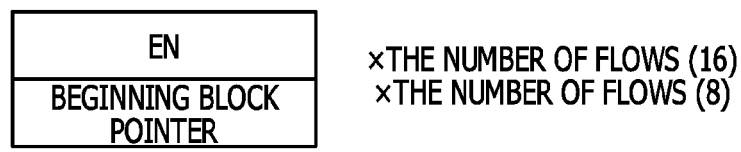

FIG. 5 illustrates a packet processing method according to the embodiment. Also, FIGS. 6A, 6B, and 6C are configuration diagrams illustrating an example of a configuration of pointers used in the embodiment.

A buffer 16 includes a plurality of blocks 160. The block 160 is a storage area for storing one or more packets, and has 1024 address spaces, for example. In the present embodiment, in order to identify each of the blocks 160, block numbers of 0 to 115 (numeric characters in frames) are used.

The plurality of blocks 160 in the buffer 16 are divided into a plurality of groups G0 to G7 corresponding to a plurality of periods TR0 to TR7 in once cycle of the packet processing, respectively. For example, 16 blocks 160 having the block numbers "32", "33", "34", ..., and "47" belong to a group G2 corresponding to the period TR2. Also, 16 blocks 160 having the block numbers "80", "81", "82", ..., and "95" belong to a group G5 corresponding to the period TR5. In this regard, in the embodiment, the plurality of periods TR0 to TR7 are determined to be periods obtained by equally dividing one cycle of the packet processing by eight. However, the determination of a period is not limited to this.

In the present embodiment, in order to manage the blocks 160 to be processed by the write processing 83, a block counter 85 is used in place of the above-described block pointer chain 90. As illustrated in FIG. 6A, the block counter 85 counts a block pointer of a block 160 to be processed by the write processing 83 as each of the periods TR0 to TR7, that is to say, as the beginning block numbers +0 to 15 of each of the groups G0 to G7. The block counter 85 notifies the block pointer (counter value) obtained by counting to the address pointer chain 82.

The block pointer notified by the block counter 85 adds 1 to the beginning block number, that is to say, the initial number corresponding to each of the periods TR0 to TR7 each time the write processing 83 on one block 160 is completed. For example, in the case of the group G2, the block counter 85 notifies the block numbers "32", "33", "34", ..., and "47" in sequence, and in the case of the group G5, the block counter 85 notifies the block numbers "80", "81", "82", ..., and "95" in sequence. Accordingly, the block counter 85 is reset each time one of the periods TR0 to TR7 of the write processing 83 proceeds. In this regard, the block counter 85 is formed by a flip-flop (FF), for example.

The notified block pointer is linked to the last of the address pointer chain 82. As illustrated in FIG. 6B, the address pointer chain 82 is disposed for each of the flows #0 to #15, and has a structure in which next block pointers, that is to say, the block numbers to be written next or to be read next are linked with each other. To put it another way, the address pointer chain 82 has a structure in which the block pointers indicating the addresses (block numbers) of the blocks 160 in which packets are written are linked with each other in sequence among the plurality of blocks 160.

Further, the address pointer chain 82 has a write address and a read address that are corresponding to each of the next block pointers, respectively. That is to say, the address pointer chain 82 has the same structure as that of the address pointer chain 92 in the comparative example. In this regard, the address pointer chain 82 is stored by a storage mechanism, such as a random access memory (RAM), and the like, for example.

The block counter 85 notifies the block pointers to all the addresses of the last blocks 160 in the address pointer chain 82 each time the write processing 83 completes writing a packet. The notified block pointers are linked to the last block 160, that is to say, the next block pointers, and thus are recorded in the address pointer chain 82. Thereby, the write processing 83 is performed on the newly recorded block 160.

On the other hand, the packet read processing 84 is performed in sequence from the block 160 indicated by the next block pointer located at the beginning of the address pointer chain 82. More specifically, in the read processing 84, the block pointers in the address pointer chain 82 are referenced in sequence, and packets are read from the blocks 160 having the block numbers (addresses) indicated by the block pointers among the plurality of blocks 160. Thereby, the read processing 84 is performed so as to follow the address pointer chain 82. In this regard, the read packet is transmitted to the other apparatuses through the transmission line.

The write processing 83 and the read processing 84 are performed on the block pointers of the groups G0 to G7 in accordance with the above-described periods TR0 to TR7, respectively. The periods TR0 to TR7 for the write processing 83 and the read processing 84 are different with each other, and proceed to the other periods in sequence with passage of a certain time. That is to say, the periods TR0 to TR7 are repeated.

Accordingly, in the write processing 83, a packet is written into a block 160 that belongs to a group corresponding to the period TR in which the packet is received among the plurality of groups G0 to G7. In the example in FIG. 5, the write processing 83 is performed by targeting the blocks 160 that belong to the group G5. At this time, the block counter 85 notifies the block numbers "80", "81", "82", . . . , and "95" of the blocks 160 that belong to the group G5 in sequence each time writing to a block 160 is completed.

Also, in the read processing 84, a packet is read from a block 160 that belongs to a group corresponding to one of the periods TR0 to TR7 among the plurality of groups G0 to G7. In the example in FIG. 5, the read processing 84 is performed on the block 160 that belongs to the group G2. That is to say, the read processing 84 is performed by targeting the block numbers "32", "34", and "33", which have been recorded in the address pointer chain 82.

While the write processing 83 is being executed, when one of the periods TR0 to TR7 proceeds, in order to indicate the beginning block pointer of the periods in the address pointer chain 82, a master pointer is generated as illustrated by a symbol m. As illustrated in FIG. 6C, the master pointer has a structure in which the beginning block pointer and "EN" are disposed for each of the flows #0 to #15, and for each of the periods TR0 to TR7. The beginning block pointer indicates a block pointer located at the beginning of each of the periods TR0 to TR7 for each of the flows #0 to #15 in the address pointer chain 82. Also, "EN" indicates whether the recorded beginning block pointer is valid or not. In this regard, the master pointers are stored in a storage mechanism, such as a RAM, or the like, for example.

Also, in the example in FIG. 5, the read processing 84 targets the block pointers (the block numbers "32", "34", and "33") in accordance with the period TR2. When a certain time passes, the read processing 84 targets the block pointers corresponding to the next period TR3. While the read processing 84 is being executed, when one of the periods TR0 to TR7 proceeds, a block pointer is newly determined to be processed by the read processing 84 using the master pointer as a mark.

The addresses of the plurality of blocks 160 are released when the periods TR0 to TR7 corresponding to the group come for each of the plurality of groups G0 to G7. That is to say, the blocks 160 that belong to each of the groups G0 to G7 go to a packet-writable state when one cycle of the packet processing passes.

The block counter 85 is reset each time one of the periods TR0 to TR7 of the write processing 83 proceeds, that is to say, each time a change occurs in the periods TR0 to TR7. The block counter 85 notifies the block pointers of the blocks 160 that belong to the groups G0 to G7 corresponding to the periods TR0 to TR7 after the change to the address pointer chain 82 regardless of whether the read processing 84 on the blocks 160 has been completed or not.

As a result the address of each of the blocks 160 is released when one cycle of the packet processing passes. Further, in the embodiment, the blocks 160 to be processed by the write processing 83 are divided into the groups corresponding to the periods TR0 to TR7, and are managed by the block counter 85. Accordingly, it is not desired to return a block pointer after completion of the read processing 84 unlike the above-described comparative example.

Accordingly, by the packet processing method according to the embodiment, even if a failure occurs in the memory that stores the address pointer chain 82, the above-described problem will not occur. FIG. 7 illustrates a state when a memory error has occurred in the packet processing method according to the embodiment. Here, it is assumed that a failure in the address pointer chain 82 in the flow #0 makes it difficult to read the block pointer having the block number of "32". At this time, it is not possible to follow the link of the address pointer chain 82, and thus it becomes difficult to read the block pointer of the succeeding block number "34" that belongs to the same period TR2 as that of the block pointer.

However, when one cycle of the packet processing passes, and when the period TR2 comes again, the block counter 85 notifies a new block pointer on the group G2, and thus the address of the block 160 that belongs to the group G2 is released. In this regard, at this time, if the memory error is a temporary failure caused by cosmic rays, or the like, there is little possibility that an error related to the block pointer having the block number of "32" occurs again. Further, the periods TR0 to TR7, and the groups G0 to G7 of the blocks 160 are associated with each other, and thus the block number (address) of the failed block 160 is identified based on one of the periods TR0 to TR7, in which the error has occurred.

In this manner, in the embodiment, the address of each of the blocks 160 is released not by returning the block pointer, but by passage of one cycle of the packet processing. Accordingly, even if a memory error occurs, the packet processing continues without resting the packet transmission apparatus, or the like.

Figure 8:
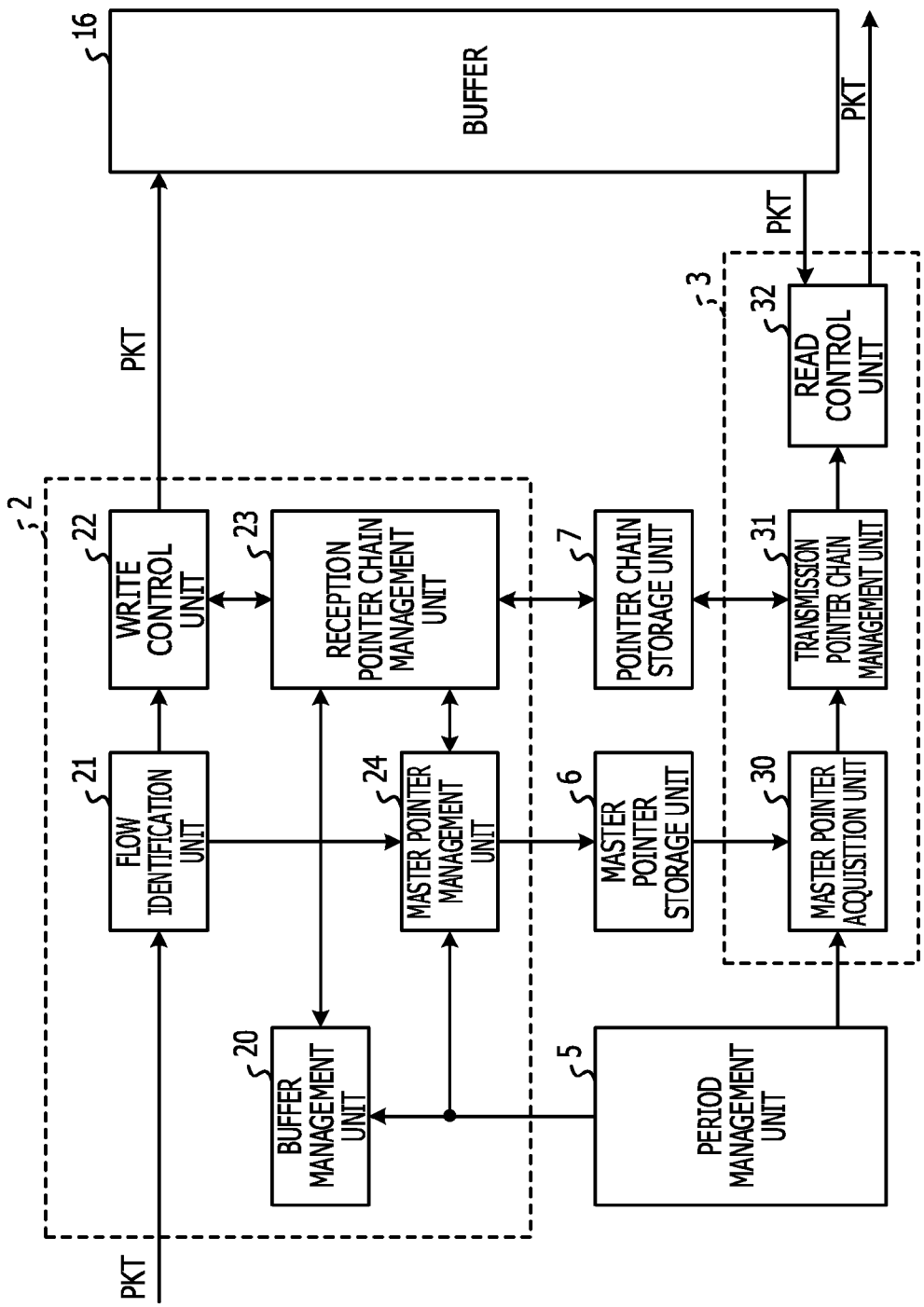
FIG. 8 is a configuration diagram illustrating a functional configuration of a packet output unit.

Next, a description will be given of a functional configuration of the packet transmission apparatus according to the embodiment. FIG. 8 is a configuration diagram illustrating the functional configuration of the packet output unit P (refer to FIG. 1).

The packet transmission apparatus includes a buffer 16, a reception processing unit 2, a transmission processing unit 3, a period management unit 5, a master pointer storage unit 6, and a pointer chain storage unit 7. The reception processing unit 2 includes a buffer management unit 20, a flow identification unit 21, a write control unit 22, a reception pointer chain management unit 23, and a master pointer management unit 24. The transmission processing unit 3 includes a master pointer acquisition unit 30, a transmission pointer management unit 31, and a read control unit 32.

The buffer 16 includes a plurality of blocks (storage areas) 160, and stores received packets. The master pointer storage unit 6 is a RAM, for example, and stores master pointers. The pointer chain storage unit 7 is a RAM, for example, and stores the address pointer chain 82.

The reception processing unit 2 and the transmission processing unit 3 performs the above-described write processing 83 and read processing 84, respectively. The period management unit 5 manages the periods TR0 to TR7 of the packet processing, and notifies one of the periods to the reception processing unit 2 and the transmission processing unit 3. The periods TR0 to TR7 of the write processing 83 and the read processing 84 are different with each other, and one of the periods changes to the next period after passage of a certain time.

The flow identification unit 21 refers to the destination information of the received packet, and identifies the flows #0 to #16. The flow identification unit 21 outputs the flow IDs indicating the flows #0 to #16, respectively, and outputs a packet to the write control unit 22. Also, the flow identification unit 21 outputs the flow IDs to the master pointer management unit 24.

The buffer management unit 20 manages the plurality of blocks 160 in the buffer 16 by dividing the plurality of blocks 160 into the plurality of groups G0 to G7 corresponding to the plurality of periods TR0 to TR7, respectively in one cycle of the packet processing. The buffer management unit 20 manages the block numbers (addresses) of the plurality of block 160 for each of the plurality of groups G0 to G7 using block counter 85, and notifies the block numbers to the write control unit 22. More specifically, the buffer management unit 20 notifies the block pointer in accordance with one of the periods TR0 to TR7, which has been notified from the period management unit 5, in response to a request from the reception pointer chain management unit 23.

The write control unit 22 writes a packet into the block 160 that belongs to the group corresponding to the period in which the packet is received among the plurality of groups G0 to G7 in accordance with an instruction of the buffer management unit 20. More specifically, the write control unit 22 obtains the block pointer corresponding to one of the periods TR0 to TR7 and the flow ID through the reception pointer chain management unit 23, and writes the packet into the block 160 indicated by the block pointer.

The reception pointer chain management unit (pointer management unit) 23 links the pointers indicating the block numbers (addresses) of the blocks in which the packet is written with each other in sequence among the plurality of blocks 160 so as to update the address pointer chain 82. Also, the reception pointer chain management unit 23 updates the write address of the address pointer chain 82 each time the write control unit 22 performs writing.

When the master pointer management unit 24 is notified of one of the periods TR0 to TR7 from the period management unit 5, the master pointer management unit 24 generates a master pointer in accordance with the flow ID from the flow identification unit 21, and writes the master pointer into the master pointer storage unit 6. At this time, the master pointer management unit 24 obtains the block pointer of the block 160 being written from the reception pointer chain management unit 23.

The transmission processing unit 3 refers to the pointers of the address pointer chain 82 in sequence, and reads a packet from the block 160 having the block number (address) indicated by the pointer among the plurality of blocks 160, and transmits the packet. More specifically, the transmission processing unit 3 reads a packet from block 160 that belongs to the group corresponding to the period in which a packet is transmitted among the plurality of groups G0 to G7, and transmits the packet. Accordingly, a packet to be transmitted is determined in accordance with one of the periods TR0 to TR7 so that the packet transmission processing becomes easy.

The master pointer acquisition unit 30 obtains a master pointer corresponding to one of the periods TR0 to TR7 notified from the period management unit 5 from the master pointer storage unit 6. The master pointer acquisition unit 30 notifies the master pointer to the transmission pointer management unit 31.

The transmission pointer management unit 31 obtains the block pointer of the address pointer chain 82 in accordance with the master pointer from the master pointer acquisition unit 30, and notifies the block pointer to the read control unit 32. The read control unit 32 reads a packet from the block 160 indicated by the block pointer notified from the transmission pointer management unit 31. The transmission pointer management unit 31 updates a read address of the address pointer chain 82 each time the read control unit 32 reads a packet.

When one of the periods TR0 to TR7 corresponding to each of the plurality of groups G0 to G7 has come, the buffer management unit 20 releases the address of the storage area that belongs to the group among the plurality of storage areas 160 as an address at which a packet is written. Accordingly, the same advantages as those of the contents described with reference to FIG. 5 to FIG. 7 are obtained.

Also, with this configuration, in addition to the contents described above, the amount of logic, for example a gate size, and the storage capacity, such as, a memory, and the like are reduced. In the following, a description will be given of the processing of the packet transmission apparatus according to the embodiment in comparison with the processing of the comparative example, which has been illustrated in FIG. 2 to FIG. 4.

Figure 9:
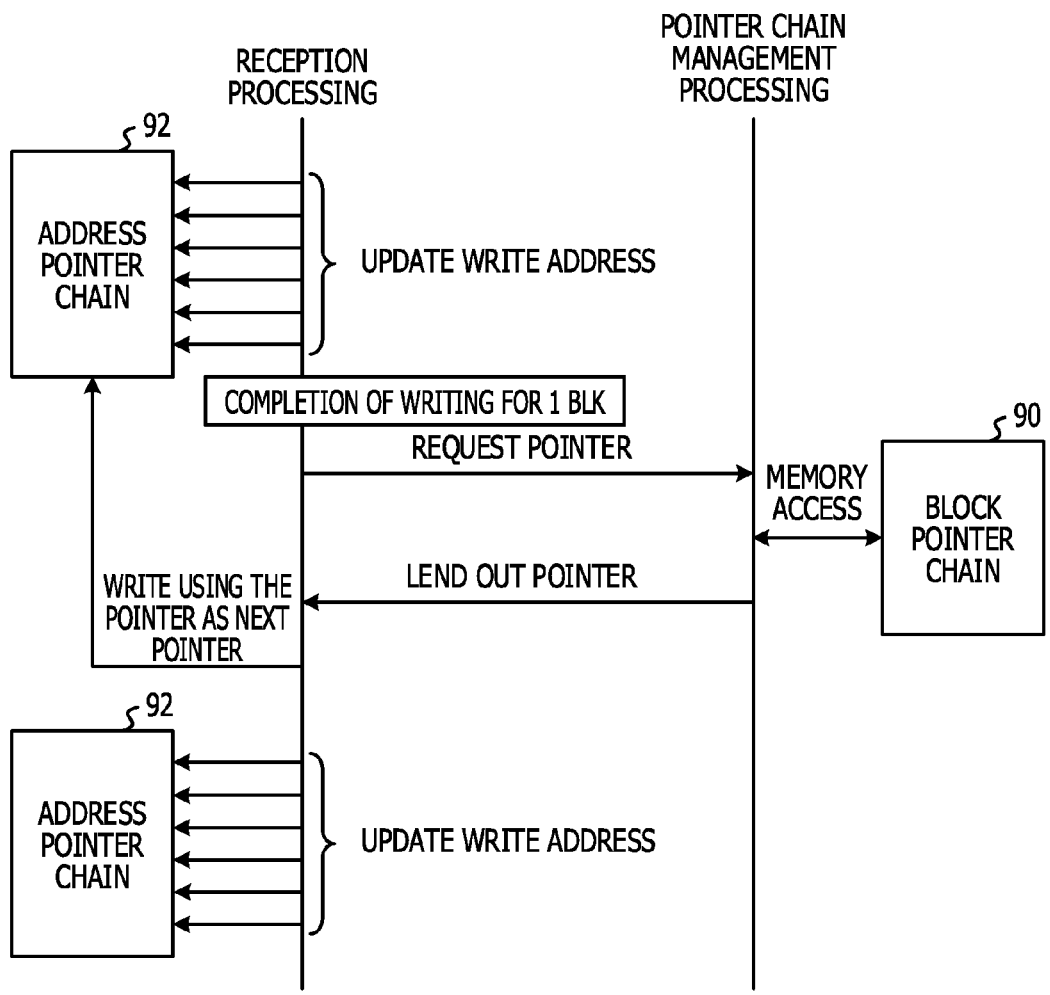
FIG. 9 is a ladder chart illustrating packet reception processing in the comparative example.

FIG. 9 is a ladder chart illustrating packet reception processing in the comparative example. In the reception processing, the write address of the address pointer chain 92 is updated each time the write processing 93 is performed. In addition, when writing for one block (BLK) 910 is completed, a block pointer is requested from the pointer chain management processing.

In the pointer chain management processing, access is made to a memory that stores the block pointer chain 90 so that a block pointer of the empty block 910 is obtained. The block pointer of the empty block 910 is lent to the reception processing. In the reception processing, the lent block pointer is written as the next block pointer (refer to FIG. 3B) of the address pointer chain 92.

Thereby, the reception processing is performed on a new block 910 indicating the block pointer, and the write address of the address pointer chain 92 is updated each time the write processing 93 is performed.

Figure 10:
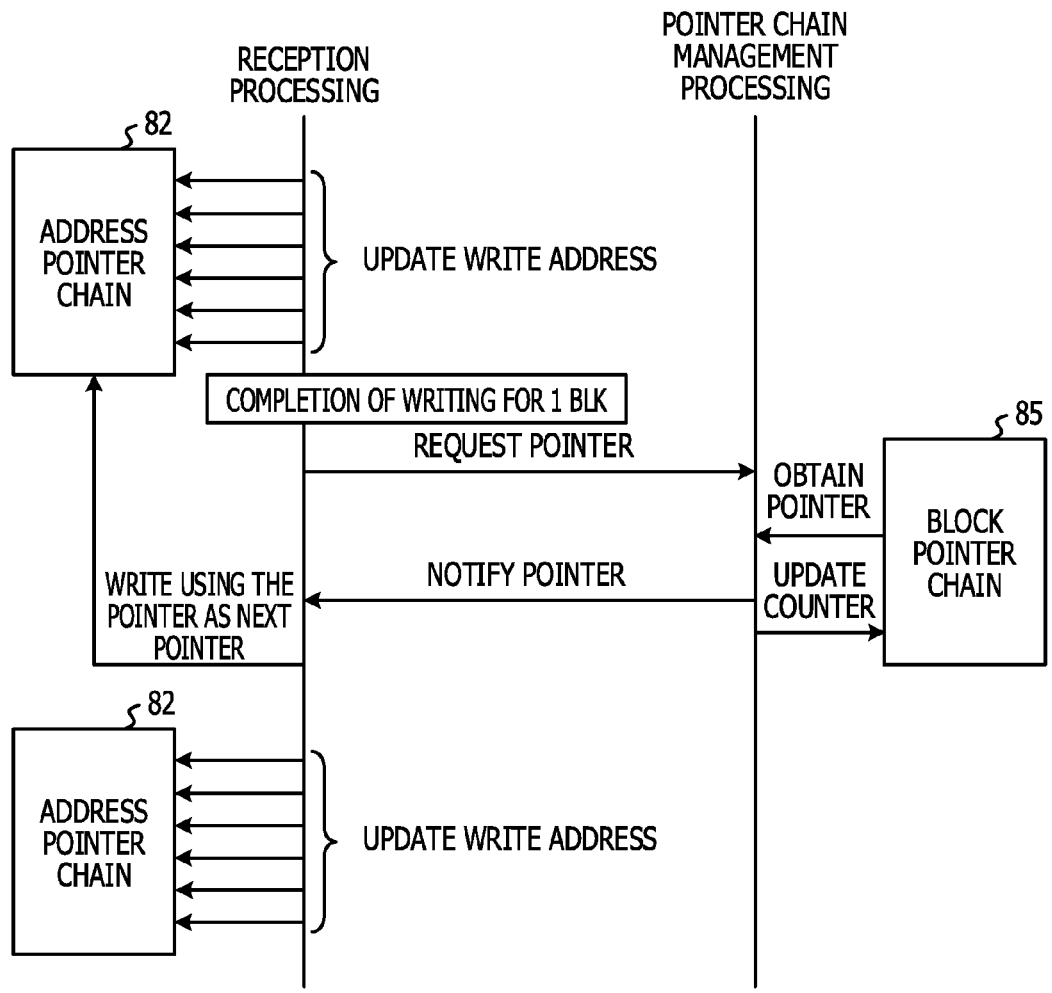
FIG. 10 is a ladder chart illustrating packet reception processing in the embodiment.

On the other hand, FIG. 10 is a ladder chart illustrating the packet reception processing in the embodiment. That is to say, FIG. 10 illustrates the processing of the reception processing unit 2 in FIG. 8.

The write address of the address pointer chain 82 is updated each time the write processing 83 is performed. When writing for one block (BLK) 160 is completed, a block pointer is requested from the pointer chain management processing (the buffer management unit 20).

In the pointer chain management processing, a block pointer is obtained from the block counter 85, and is notified to the reception processing. That is to say, the buffer management unit 20 manages the block pointers (addresses) of the plurality of blocks 160 for each of the plurality of groups G0 to G7 using a counter, and notifies the block pointers to the write control unit 22.

At this time, the counter value of the block counter 85 is updated so that a block pointer to be notified next is provided. In the reception processing, the notified block pointer is written into as the next block pointer (refer to FIG. 6B) of the address pointer chain 82.

Thereby, the reception processing is performed on a new block 160 indicated by the block pointer. The write address of the address pointer chain 82 is updated each time the write processing 83 is performed.

As is understood by comparing FIG. 9 and FIG. 10, in the comparative example, the block pointer chain 90 is used, whereas in the embodiment, the block counter 85 is used. The block pointer chain 90 is formed by a memory, such as a RAM, or the like, whereas the block counter 85 is formed by a counter circuit using FFs. Accordingly, by the embodiment, the memory capacity is made smaller in size, and the processing is more simplified than the comparative example.

Figure 11:
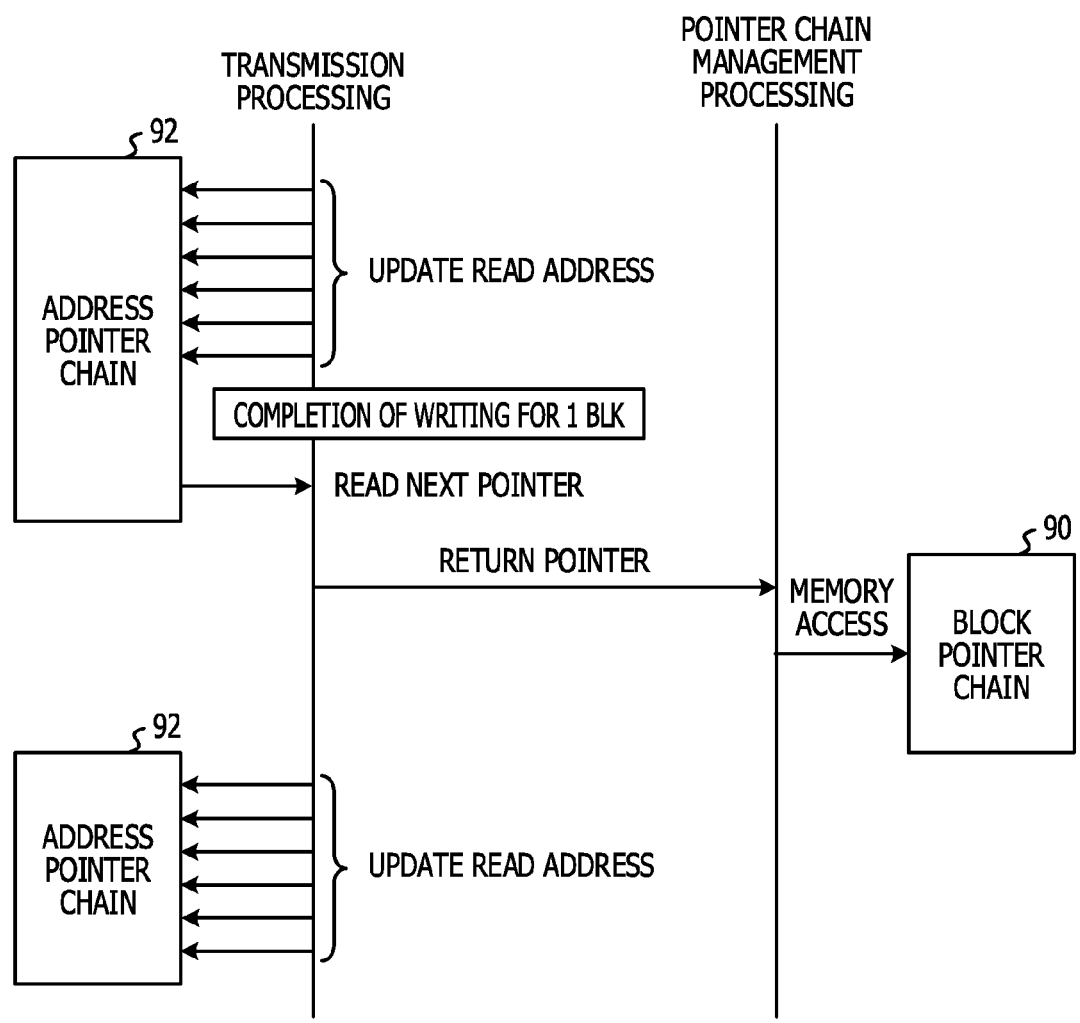
FIG. 11 is a ladder chart illustrating packet transmission processing in the comparative example.

Also, FIG. 11 is a ladder chart illustrating packet transmission processing in the comparative example. In the transmission processing, the read address of the address pointer chain 92 is updated each time the read processing 94 is performed. When reading for one block (BLK) 910 is completed, the next block pointer is read from the address pointer chain 92. Also, the block pointer by which the reading has been completed is returned.

In the pointer chain management processing, the returned block pointer is recorded in the block pointer chain 90 as an empty block 910, and thus access is made to the memory that stores the block pointer chain 90. In the transmission processing, the read processing 94 on the next block 910 is performed, and the read address of the address pointer chain 92 is updated.

Figure 12:
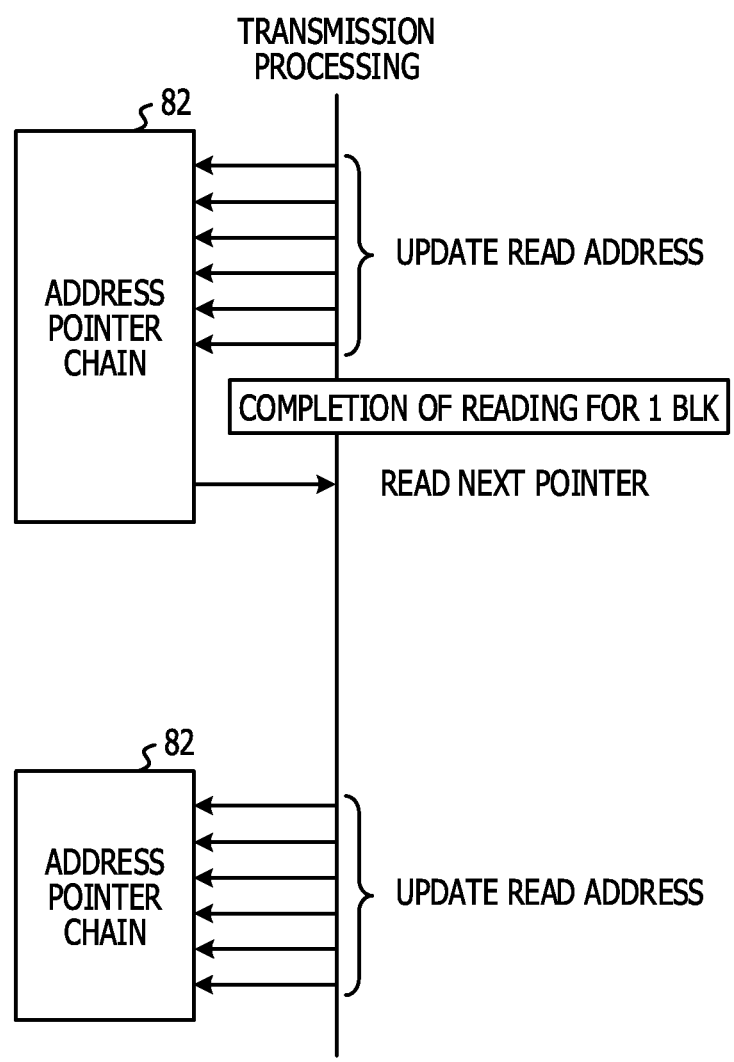
FIG. 12 is a ladder chart illustrating packet transmission processing in the embodiment.

On the other hand, FIG. 12 is a ladder chart illustrating packet transmission processing in the embodiment. That is to say, FIG. 12 illustrates the processing of the transmission processing unit 3 illustrated in FIG. 8.

In the transmission processing, the read address of the address pointer chain 82 is updated each time the packet read processing 84 is performed. When reading for one block (BLK) 160 is completed, the next block pointer is read from the address pointer chain 82. In the transmission processing, the read processing 84 on the next block 160 is preformed, and the read address of the address pointer chain 82 is updated.

As is understood by comparing FIG. 11 and FIG. 12, in the comparative example, a pointer is returned, whereas in the embodiment, a pointer is not returned. Accordingly, by the embodiment, the memory capacity is made smaller in size, and the processing is more simplified than the comparative example.

Figure 13:
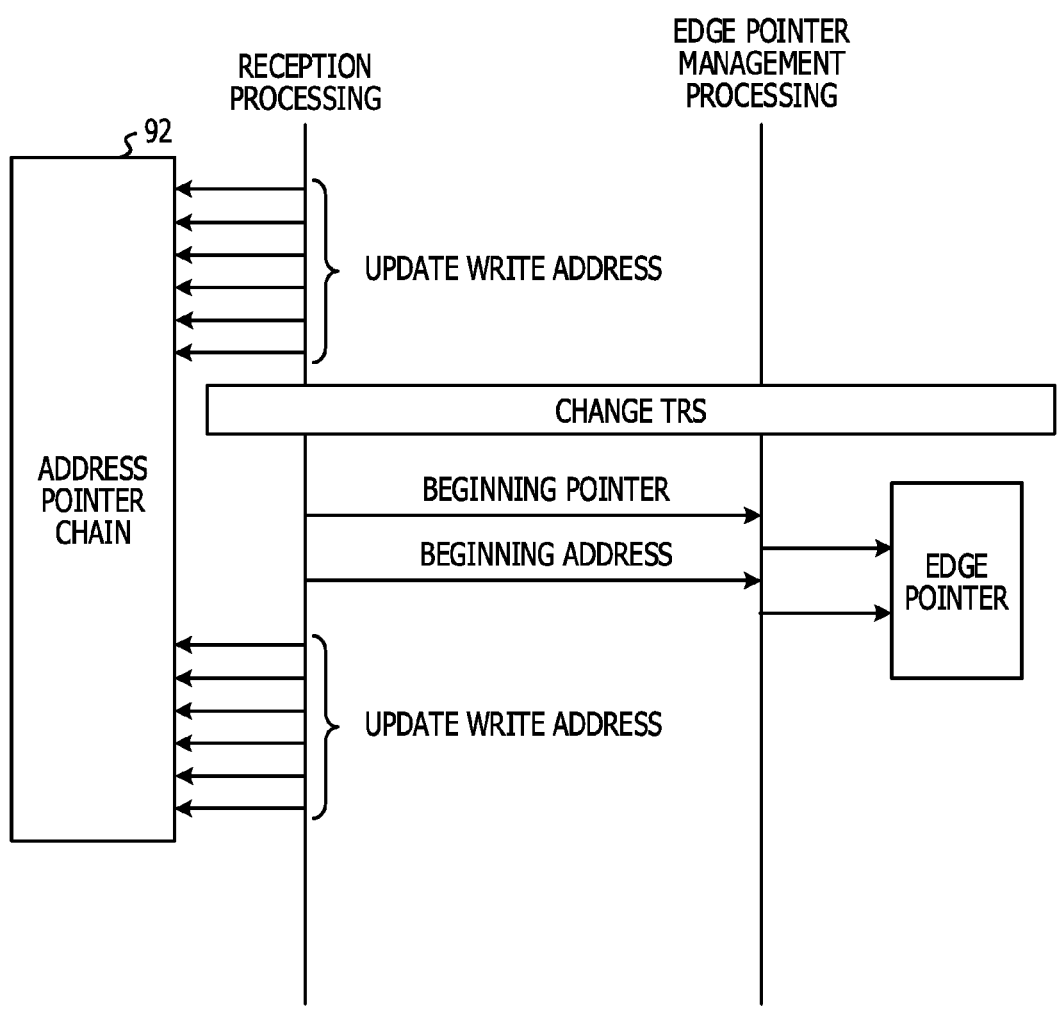
FIG. 13 is a ladder chart illustrating packet reception processing at the time of changing periods in the comparative example.

Also, in the comparative example, as described below, when a period change occurs (proceeds), there are cases where block pointers are changed, and the cases where block pointers are not changed. FIG. 13 is a ladder chart illustrating the packet reception processing at the time of changing periods in the comparative example. The example in FIG. 13 illustrates the case where block pointers are not changed.

In the reception processing, while the write processing 93 is updating the write address of the address pointer chain 92, if a change in period (TR) occurs, the beginning block pointer and the beginning address are notified to the edge pointer management processing, and an edge pointer is generated.

Figure 14:
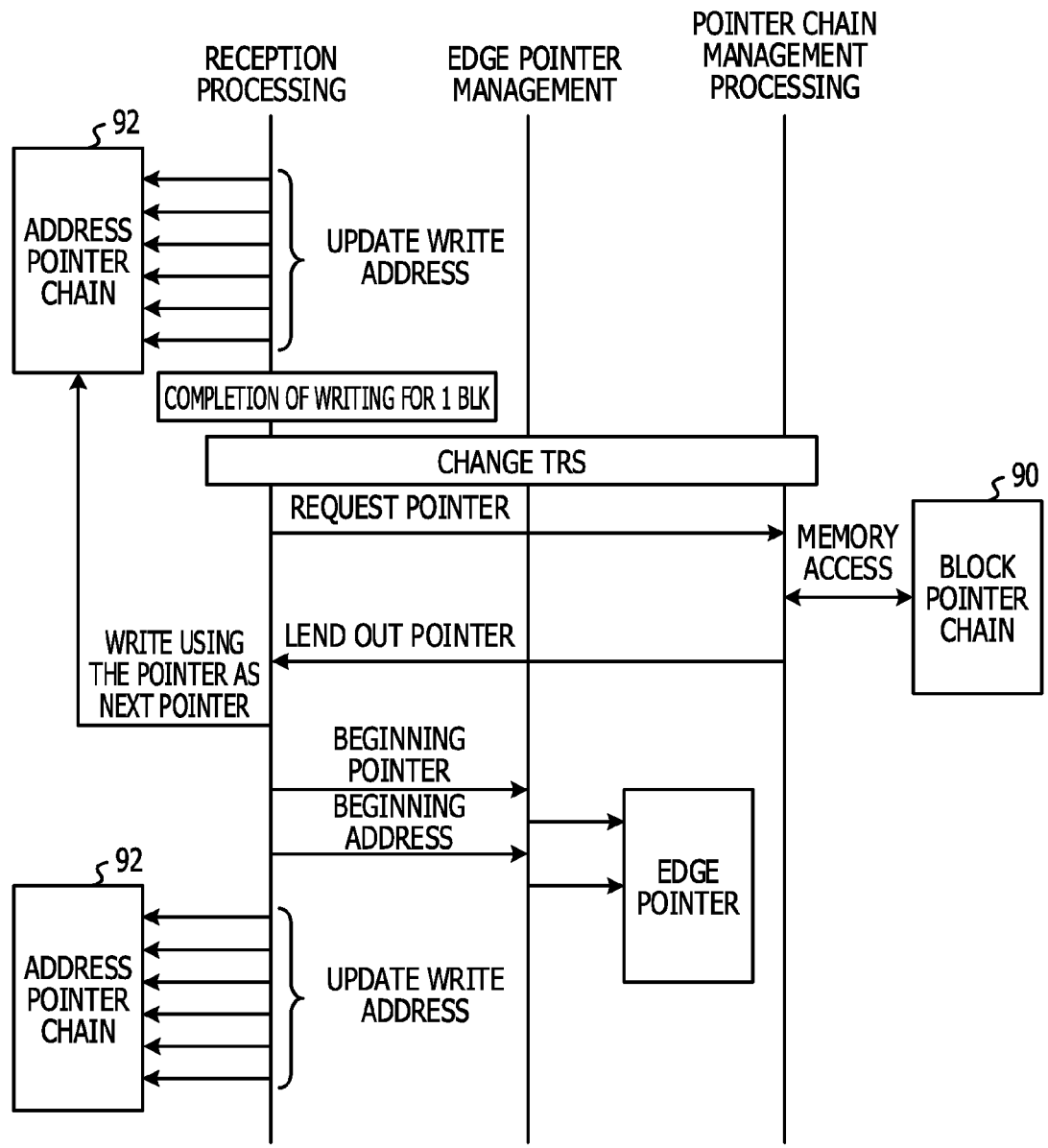
FIG. 14 is a ladder chart illustrating packet reception processing at the time of changing periods in the comparative example.

On the other hand, the example in FIG. 14 illustrates the case where block pointers are changed. In the reception processing, when write processing 93 for one block (BLK) 910 is completed, if a change in periods occurs in addition to the edge pointer management processing illustrated in FIG. 13, the pointer chain management processing is performed. That is to say, in order to change the blocks to be written, a block pointer is lent out from the block pointer chain 90.

As is understood by comparing FIG. 13 and FIG. 14, in the comparative example, when a period change occurs (proceeds), there are cases where block pointers are changed, and the cases where block pointers are not changed. Accordingly, the circuit configuration of the hardware is complicated, and the amount of logic is increased.

In contrast, in the embodiment, as described above, the blocks 160 are divided into the groups G0 to G7 corresponding to the periods TR0 to TR7, respectively, are then managed, and thus the block pointers are obtained each time a period is changed.

Figure 15:
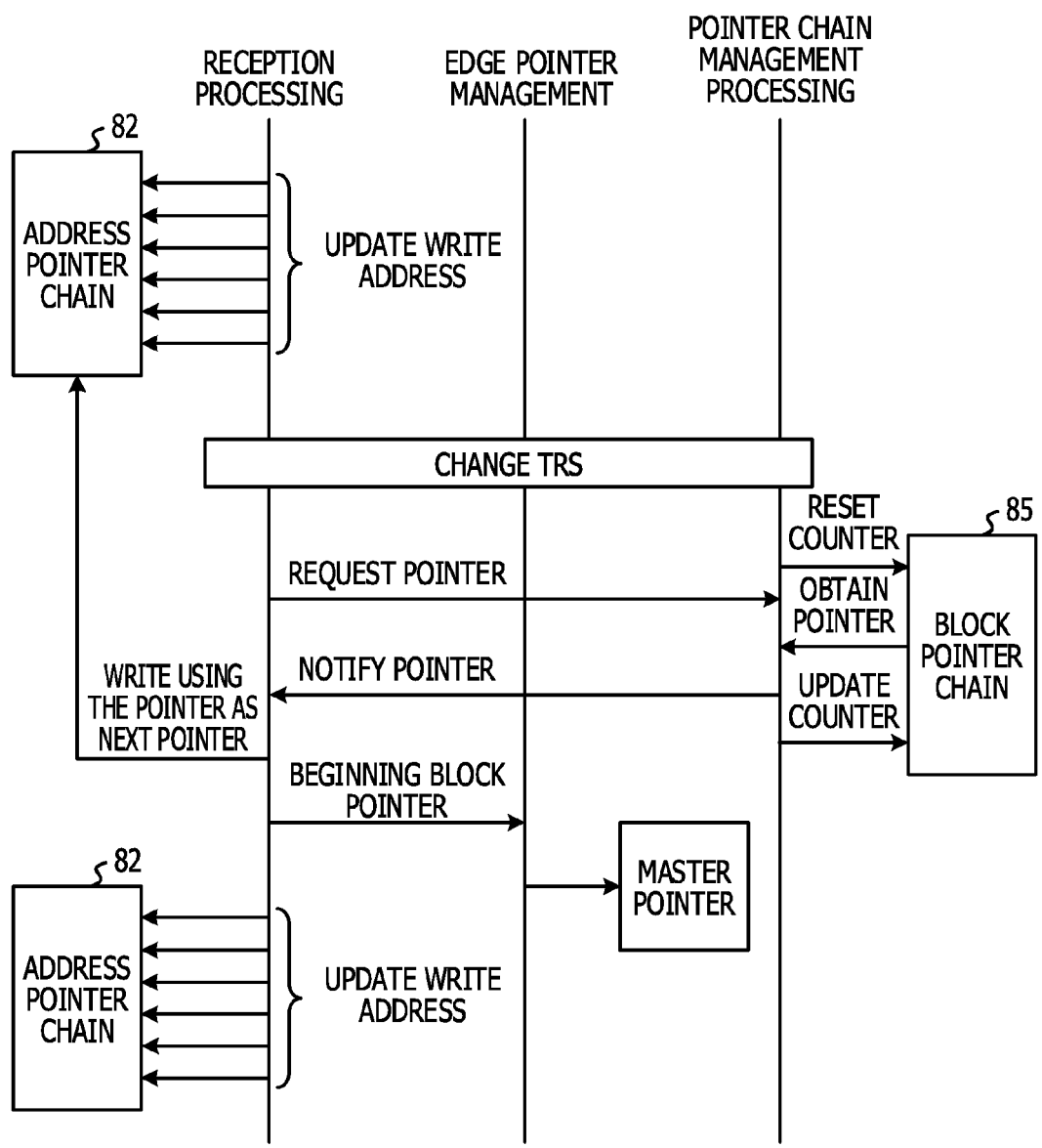
FIG. 15 is a ladder chart illustrating packet reception processing at the time of changing periods in the embodiment.

FIG. 15 is a ladder chart illustrating packet reception processing at the time of changing periods in the embodiment. In the reception processing, while the write processing 83 is being executed, if a period change occurs, the master pointer management processing and the pointer chain management processing are performed.

In the pointer chain management processing, the block counter 85 is reset to initialize the count value in response to a period change. Next, the block pointer is obtained from the block counter 85 in response to a request for a block pointer. The obtained block pointer is notified to the reception processing. Also, the counter value of the block counter 85 is updated so that a block pointer to be notified next is provided.

In the reception processing, the notified block pointer is written as the next block pointer of the address pointer chain 82. Also, in the reception processing, the beginning block pointer is notified to the master pointer management processing (the master pointer management unit 24) to generate a master pointer.

In addition, the reception processing is performed on a new block 160 indicated by the block pointer, and the write address of the address pointer chain 82 is updated each time the write processing 83 is performed.

In this manner, in the embodiment, the processing is not performed separately depending on the cases at the time of the occurrence of a period change, and thus the amount of logic is reduced, and the circuit configuration of the hardware is simplified as compared with the comparative example.

As described above, the packet transmission apparatus according to the embodiment includes the buffer 16 that stores the received packets, the buffer management unit 20, the write control unit 22, and the pointer management unit 23. The buffer management unit 20 divides the plurality of storage areas (blocks) 160 in the buffer 16 into the plurality of groups G0 to G7 corresponding to the plurality of periods TR0 to TR7, respectively, in one cycle of the packet processing.

The write control unit 22 writes a packet into a storage area 160 that belongs to a group corresponding to one of the periods TR0 to TR7 in which the packet is received among the plurality of groups G0 to G7 in accordance with an instruction of the buffer management unit 20. The pointer management unit 23 links the pointers (block pointers) indicating the addresses (the block numbers) of the storage areas in which packets have been written with each other in sequence among the plurality of storage areas 160.

The transmission processing unit 3 refers to the pointers in sequence, and reads a packet from the storage area of the address indicated by the pointer out of the plurality of storage areas 160, and transmits the packet. When one of the periods TR0 to TR7 corresponding to each of the plurality of groups G0 to G7 has come, the buffer management unit 20 releases the address of the storage area that belongs to the group among the plurality of storage areas 160 as an address at which a packet is written.

By the packet transmission apparatus according to the embodiment, the buffer management unit 20 divides and manages the plurality of storage areas 160 in the buffer 16 into the plurality of groups G0 to G7 corresponding to the plurality of periods TR0 to TR7, respectively, in one cycle of the packet processing. The write control unit 22 writes a packet into a storage area 160 that belongs to one of the groups G0 to G7 corresponding to the periods TR0 to TR7, respectively, in a cycle of the packet processing in accordance with an instruction of the buffer management unit 20, and thus the periods TR0 to TR7 and the storage areas 160 are associated with each other, respectively. Accordingly, the address of the storage area 160 having a failure is identified based on one of the periods TR0 to TR7, in which an error has occurred.

Also, the pointer management unit 23 links the pointers indicating the addresses of the storage area 160 in which the packets have been written with each other in sequence among the plurality of blocks 160. The transmission processing unit 3 refers to the pointers, and reads a packet from the storage area 160 of the address indicated by the pointer, and transmits the packet, and thus packets are read from the storage areas 160 in which packets are written in sequence, and are transmitted.

Also, when one of the periods TR0 to TR7 corresponding to each of the plurality of groups G0 to G7 has come, the buffer management unit 20 releases the address of the storage area that belongs to the group among the plurality of storage areas 160 as an address at which a packet is written. Accordingly, it becomes possible to write a packet into the storage area 160 that belongs to each group when the relevant period in the cycle comes.

Accordingly, it is not desired for the transmission processing unit 3 to return a pointer after reading a packet in order to release the address of the storage area 160, and thus even if it is not possible to read a pointer because of a memory error, the storage areas 160 for writing packets do not become insufficient. Thus, by the packet transmission apparatus according to the embodiment, the management function of the buffers is improved.

Also, the packet buffer 16 according to the embodiment stores received packets, and includes a plurality of storage areas 160 that are separated into a plurality of groups G0 to G7 that are corresponding to a plurality of periods TR0 to TR7, respectively, in one cycle of the packet processing. The packet buffer 16 stores the packets into the storage areas 160 that belong to the groups in accordance with the periods TR0 to TR7 in which the packets are received among the plurality of groups G0 to G7, respectively. When one of the periods TR0 to TR7 corresponding to each of the plurality of groups G0 to G7 has come, the addresses of the storage areas that belong to the group among the plurality of storage areas 160 are released as the addresses at which packets are to be written.

The packet buffer 16 according to the embodiment has an overlapping configuration as that of the above-described packet transmission apparatus, and thus has the same operational advantages as the above-described contents.

Also, the packet processing method according to the embodiment includes each process of the following (1) to (5).

(1) Process to divide a plurality of storage areas 160 in the buffer 16 that stores received packets into a plurality of groups G0 to G7 corresponding to a plurality of periods TR0 to TR7, respectively, in a cycle of the packet processing (2) Process to write a packet into a storage area 160 that belongs to a group in accordance with a period in which the packet is received among the plurality of groups G0 to G7

(3) Process to link pointers (block pointers) indicating the addresses (block numbers) of the storage areas in which packets have been written with each other in sequence among the plurality of storage areas 160

(4) Process to refer to pointers in sequence, to read a packet from the storage area 160 of the address indicated by the pointer among the plurality of storage areas 160, and to transmit the packet (5) When one of the plurality of the periods TR0 to TR7 corresponding to each of the groups G0 to G7 has come, process to release the address of each storage area that belongs to the group as the address at which the packets are written A packet processing method according to the embodiment has the same configuration as that of the above-described packet transmission apparatus, and thus has the same operational advantages as the above-described contents.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A packet processing method comprising:
   receiving a first packet to be stored in a buffer including a plurality of storage areas, each of the plurality of storage areas being associated a respective unit period of a plurality of unit periods in one cycle of packet processing;
   selecting a first storage area from the plurality of storage areas included in the buffer as a packet storage area in accordance with a first time at which the first packet is received, the first time being within the respective unit period associated with the first storage area;
   storing the received first packet into the selected first storage area;
   after the one cycle of packet processing has passed from a start time of the respective unit period associated with the first storage area and a second packet is then received, selecting the first storage area as a packet storage area for the second packet; and storing the received second packet in the first storage area selected as the packet storage area for the second packet in a state in which the first packet stored in the first storage area has not yet been transmitted from the first storage area.

2. The packet processing method according to claim 1, wherein the plurality of storage areas are selected in sequence as a packet storage area for a received packet every time the unit period passes.

3. The packet processing method according to claim 2, wherein after the start time of the respective unit period associated with the first storage area, the first storage area is selected as a packet storage area for a received packet every time the one cycle of packet processing passes.

4. The packet processing method according to claim 1, further comprising:
   after the first time, receiving a third packet at a second time;
   selecting a second storage area from the plurality of storage areas as a packet storage area for the third packet in accordance with the second time;
   storing the third packet into the selected second storage area;
   storing a first pointer indicating a first address of the first storage area, and a second pointer indicating a second address of the second storage area in sequence; and
   transmitting the first packet and the third packet in order based on the first pointer and the second pointer.

5. A packet transmission apparatus comprising:
   a memory; and
   a processor coupled to the memory and configured to
      receive a first packet to be stored in a buffer including a plurality of storage areas, each of the plurality of storage areas being associated a respective unit period of a plurality of unit periods in one cycle of packet processing,
      select a first storage area from the plurality of storage areas included in the buffer as a packet storage area in accordance with a first time at which the first packet is received, the first time being within the respective unit period associated with the first storage area,
      store the received first packet into the selected first storage area,
      after the one cycle of packet processing has passed from a start time of the respective unit period associated with the first storage area and a second packet is then received, select the first storage area as a packet storage area for the second packet, and
      store the received second packet in the first storage area selected as the packet storage area for the second packet in a state in which the first packet stored in the first storage area has not yet been transmitted from the first storage area.

6. The packet transmission apparatus according to claim 5, wherein the plurality of storage areas are selected in sequence as a packet storage area for a received packet every time the unit period passes.

7. The packet transmission apparatus according to claim 6, wherein after the start time of the respective unit period associated with the first storage area, the first storage area is selected as a packet storage area for a received packet every time the one cycle of packet processing passes.

8. The packet transmission apparatus according to claim 5, wherein the processor is configured to:
   after the first time, receive a third packet at a second time,
   select a second storage area from the plurality of storage areas as a packet storage area for the third packet in accordance with the second time,
   store the third packet into the selected second storage area,
   store a first pointer indicating a first address of the first storage area, and a second pointer indicating a second address of the second storage area in sequence, and
   transmit the first packet and the third packet in order based on the first pointer and the second pointer.

* * * * *